Oct. 4, 1966   H. D. LETTS   3,276,752
LIME FEEDING DEVICE
Filed March 8, 1965   4 Sheets-Sheet 1

INVENTOR.
HAROLD D. LETTS,
BY
Berman, Davidson & Berman
ATTORNEYS.

Oct. 4, 1966  H. D. LETTS  3,276,752
LIME FEEDING DEVICE
Filed March 8, 1965  4 Sheets-Sheet 3

INVENTOR.
HAROLD D. LETTS,
BY
Berman, Davidson & Berman
ATTORNEYS.

Oct. 4, 1966  H. D. LETTS  3,276,752
LIME FEEDING DEVICE

Filed March 8, 1965  4 Sheets-Sheet 4

INVENTOR.
HAROLD D. LETTS,
BY
Berman, Davidson & Berman
ATTORNEYS.

United States Patent Office 3,276,752
Patented Oct. 4, 1966

3,276,752
LIME FEEDING DEVICE
Harold D. Letts, Zelienople, Pa., assignor to Tasa Coal Company, a corporation of Pennsylvania
Filed Mar. 8, 1965, Ser. No. 437,939
10 Claims. (Cl. 259—9)

This invention relates to water treatment apparatus, and more particularly to a new and improved apparatus for feeding lime in a slurry form into a quantity of water for the purpose of neutralizing the acidity of the water.

A considerable problem has been encountered in connection with various industrial operations, for example, with coal mining operations, with respect to the pollution of natural supplies of water, such as lakes, streams, or the like, because of the introduction into these bodies of water of considerable amounts of acid material. This problem is of great concern particularly where coal mining operations are conducted in close proximity to a natural supply of water, and where a considerable amount of acid has been deposited in such a body of water, the body of water becomes substantially polluted and is unfit for use either as a source of domestic or industrial water supply or for various recreational activities. For this reason, there are numerous statutes which attempt to regulate the operation of coal mines and other industrial establishments with respect to the discharge of coal mine water or other industrial waste into streams or rivers, and the conditions of these statutes generally limit or prohibit the discharge of water containing an unreasonable amount of acid.

A prime purpose of the present invention is to provide an apparatus for treating acidic water so as to neutralize same and to thereby permit the water to meet statutory requirements with respect to discharge into external bodies of water.

Therefore, a main object of the invention is to provide a novel and improved apparatus for feeding lime or other suitable material into liquids intended to be discharged into a body of water for the purpose of neutralizing the liquid or for otherwise chemically treating same, the apparatus being simple in construction, being reliable in operation, being adjustable so as to provide a desired rate of feed, and having a high capacity relative to its size, weight and power consumption.

A further object of the invention is to provide an improved water-treating apparatus for feeding lime or other treatment material into water to neutralize same or to provide other desired chemical treatment thereof, the apparatus being inexpensive to fabricate, being durable in construction, being suitable for continuous operation, and being provided with accurate and dependable means for varying the rate of feeding of treatment material therefrom.

A still further object of the invention is to provide an improved apparatus for feeding lime in slurry form or for feeding other chemical material into mine discharge water or other industrial liquid waste material intended to be discharged into an external body of water for the purpose of neutralizing or otherwise purifying the discharged water, the apparatus having relatively few moving parts, being adapted for infinite variable manual control of the feed of the treating agent employed therewith, being such that it can be readily adapted for continuous electronic pH control, being arranged so that the treatment agent can be fed and the rate of feed thereof can be infinitely varied while the machine is operating, either by manual control, or by motorized electronic control, if so desired, and being so arranged that the rate of feed can be infinitely varied from zero to its maximum rate during machine operation, thereby providing capacity to treat a wide range of discharged liquid and to be adjusted in accordance with variations in the condition of such liquid without the necessity of stopping the apparatus or for otherwise disturbing its operation.

Further objects and advantages of the invention will become apparent from the following description and claims, and from the accompanying drawings, wherein:

Figure 1:
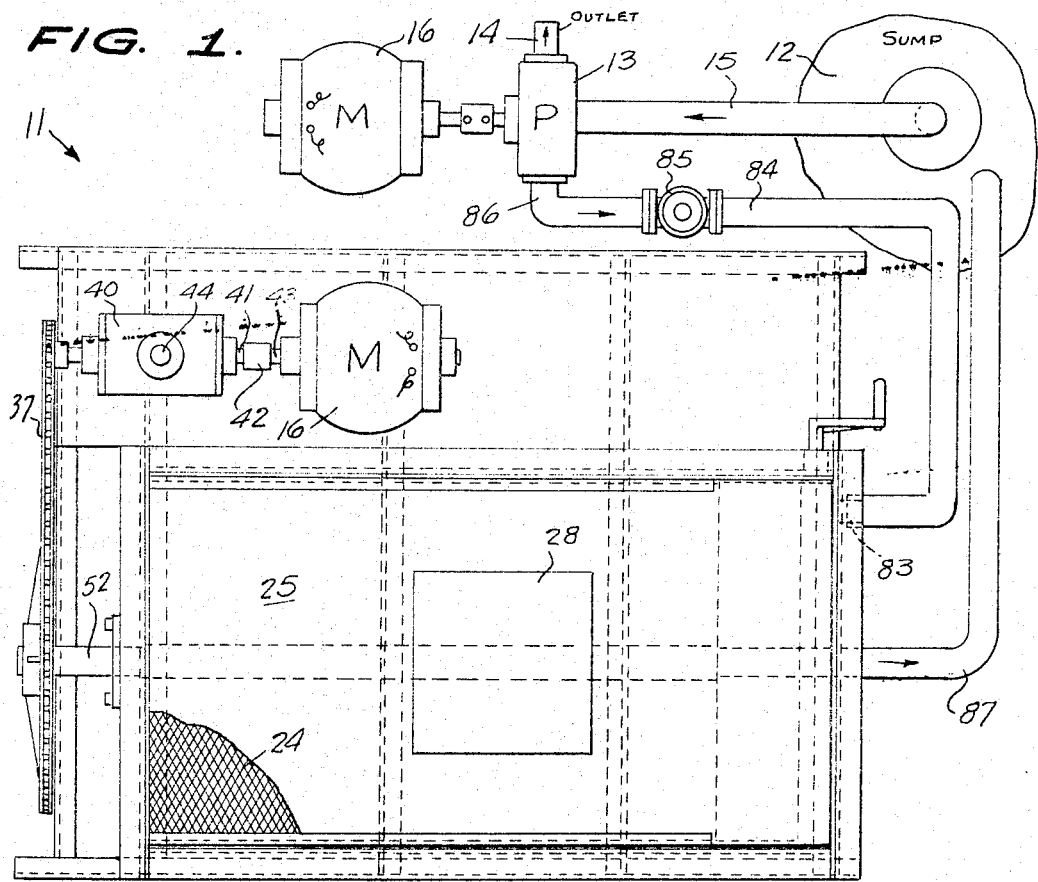
FIGURE 1 is a top plan view, partly broken away, of an improved water-treatment apparatus constructed in accordance with the present invention.
Figure 2:
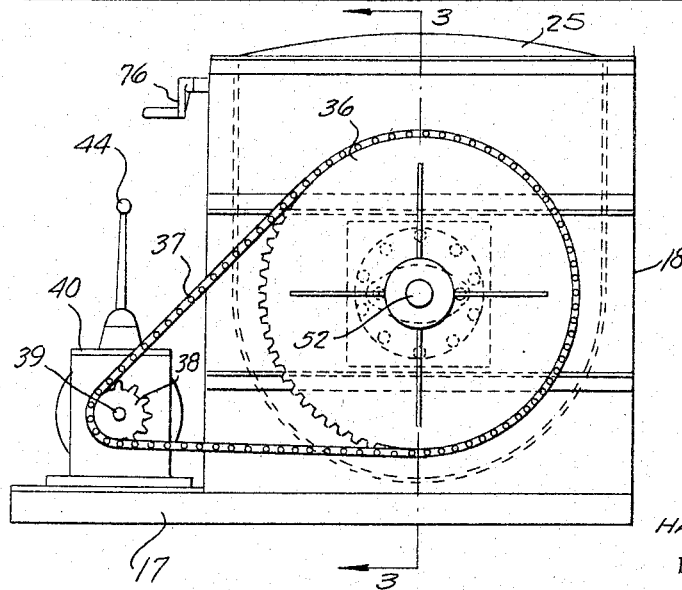
FIGURE 2 is an end elevational view of the apparatus shown in FIGURE 1.
Figure 3:
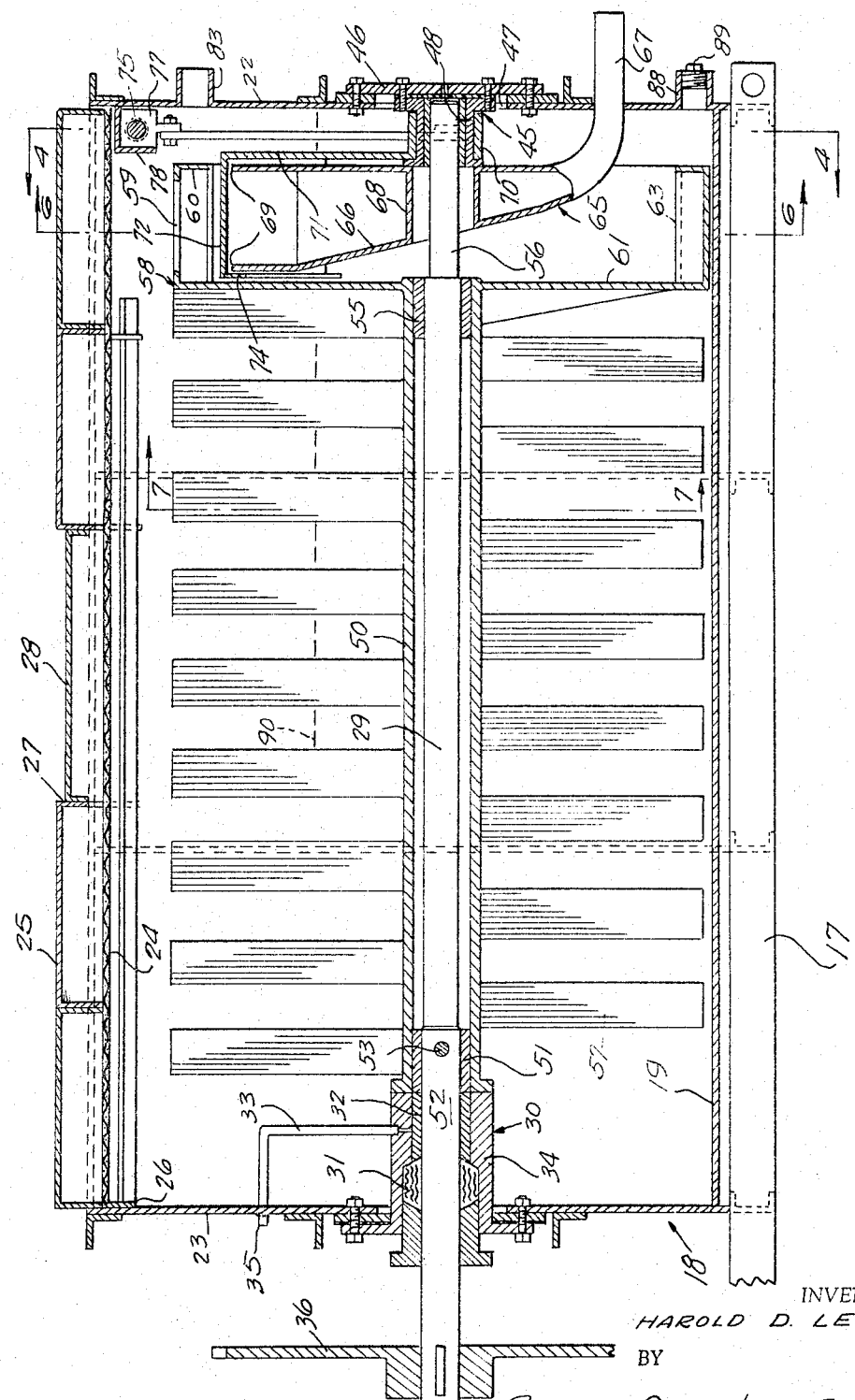
FIGURE 3 is a longitudinal vertical cross-sectional view, to a somewhat enlarged scale, of the apparatus, said view being taken substantially on the line 3—3 of FIGURE 2.

FIGUURE 6 is a transverse vertical cross-sectional view taken substantially on the line 6—6 of FIGURE 3.

Figure 7:
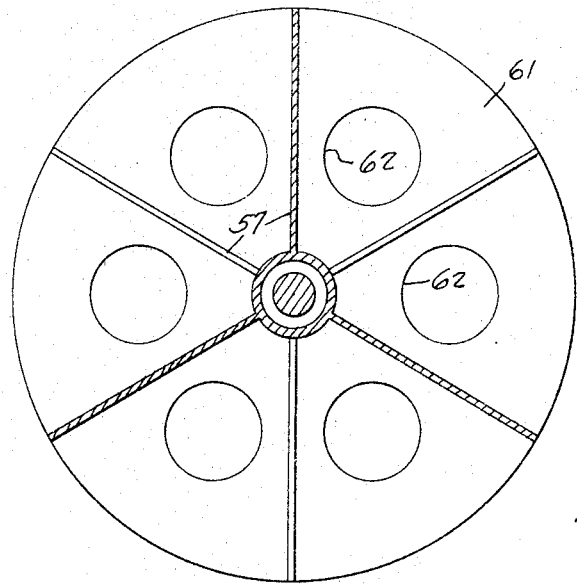

FIGURE 7 is a transverse vertical cross-sectional view taken substantially on the line 7—7 of FIGURE 3.

Figure 4:
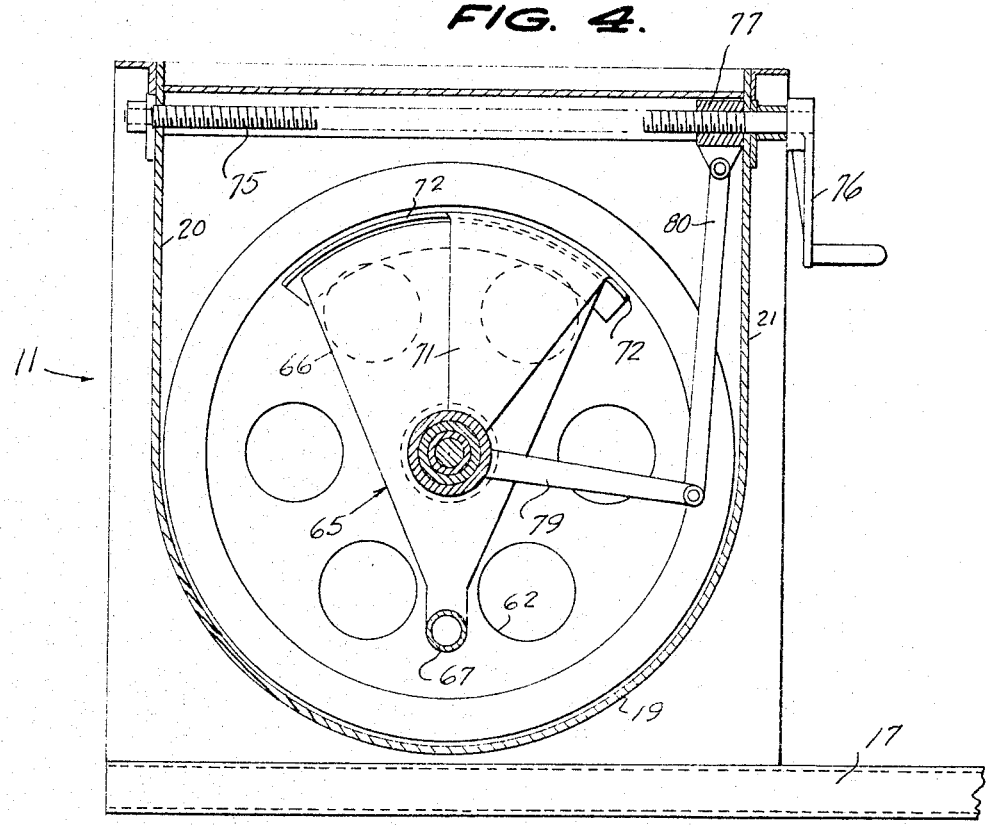
FIGURE 4 is a transverse vertical cross-sectional view, taken substantially on the line 4—4 of FIGURE 3, showing the material feed regulating mechanism substantially in its fully closed position so that there is no feed of water-treatment material through the apparatus.
Figure 5:
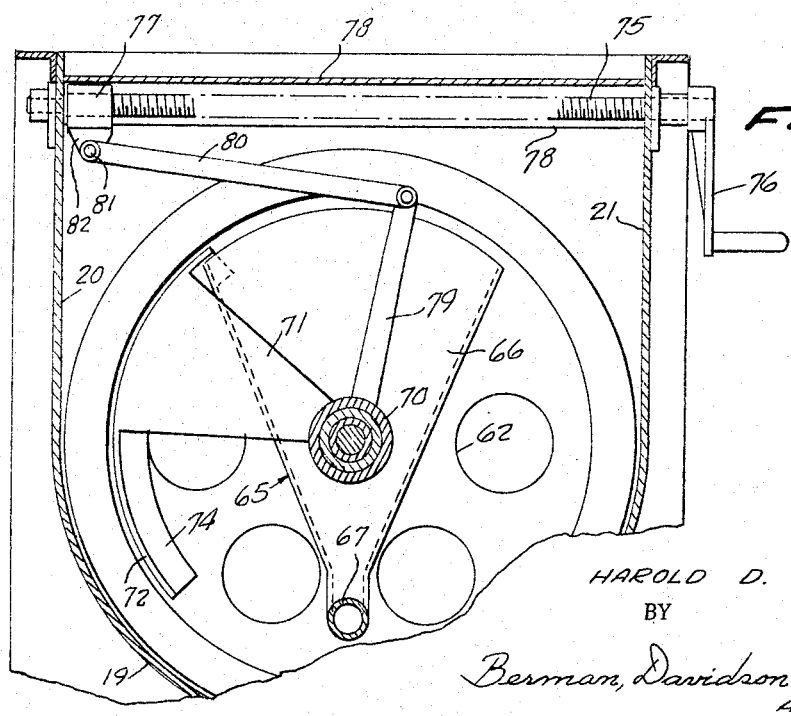
FIGURE 5 is a fragmentary transverse vertical cross-sectional view, similar to FIGURE 4, but showing the material feeding control mechanism in its substantially fully opened position, providing maximum feed of water treatment material through the apparatus.
Figure 6:
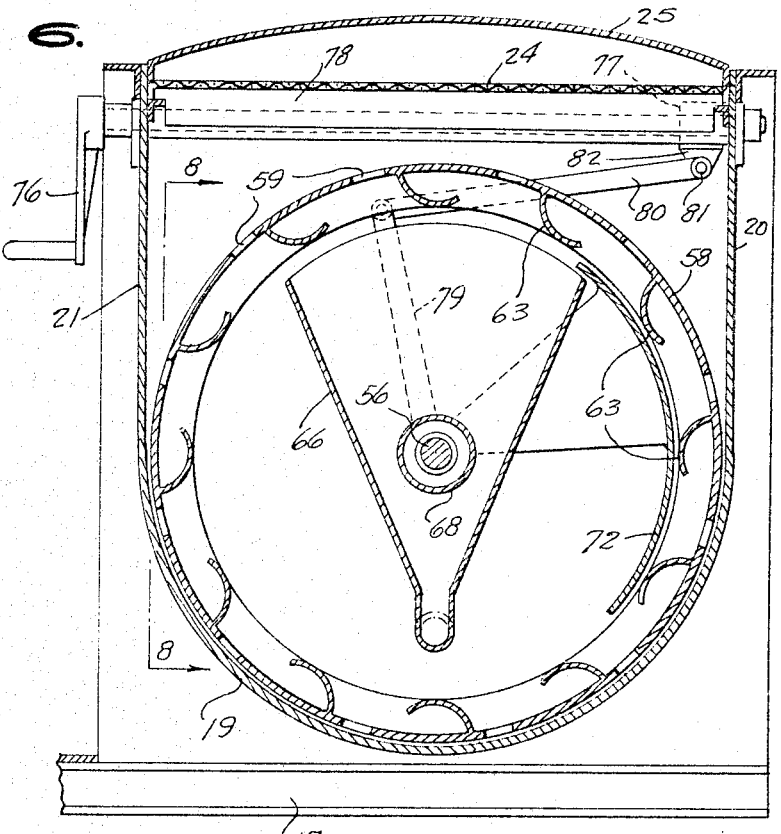
Figure 8:
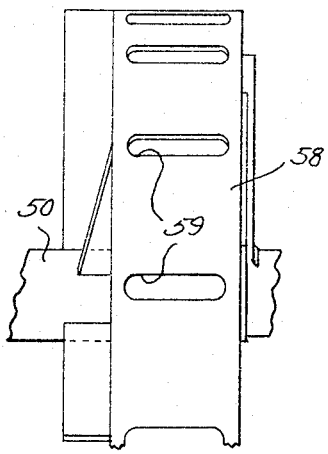

FIGURE 8 is a fragmentary elevational view of the conveyor drum portion of the rotor of the apparatus of FIGURES 1 to 7, said view being taken substantially on the line 8—8 of FIGURE 6.

Referring to the drawings, 11 generally designates improved lime feeding apparatus, adapted to feed lime slurry, or other desired chemical material, to waste water intended to be discharged into an external water body, such as a stream, lake, river, or the like. The water to be treated is supplied in any suitable manner to a sump or reservoir 12 from which it is discharged by a suitable pump, such as a centrifugal pump 13 to the external body of water through the pump conduit outlet 14. Thus, the water from the sump tank or reservoir 12 is delivered to the intake of the pump 13 through an intake conduit 15. The pump 13 is driven by a suitable driving means, such as an electric motor 16, as shown.

The pump 13 and motor 16 are mounted on a suitable supporting base 17. Mounted on said base 17 is a tank 18 of substantial capacity and of any desirable shape, for example, of generally rectangular shape in plan, having a semi-cylindrical bottom wall 19, vertical side walls 20 and 21 merging with the side margins of the upwardly concave bottom wall 19, and the transverse vertical end walls 22 and 23. The tank is provided with a top wall 24 of foraminous material, such as wire screening, over which is disposed a cover 25 of sheet metal, or the like, supported on the fixed peripheral frame 26 of the foraminous top wall 24, the cover 25 being provided with a rectangular central opening 27 in which is disposed a removable auxiliary cover 28. The cover 28 may be readily removed for the purpose of charging the tank with hydrate of lime or other suitable material intended to be used for the water treatment process.

The frame 26 carrying the foraminous top wall 24 is rigidly secured in any suitable manner to the inside surface of the top marginal portion of the inside surface of tank 18.

Journaled longitudinally in the tank 18 coaxially with the bottom wall 19 is a shaft 29. One end of the shaft extends sealingly and rotatably through a suitable bearing assembly 30 provided therefor in the end wall 23, said bearing assembly including a conventional packing gland 31 and lubricating packing 32 which is supplied with lubricant by means of a lubricant feed tube 33 which connects the cavity in the bearing supporting sleeve 34 containing the material 32 with the outside end 35 of the tube, which in turn may be connected to a suitable source of lubricant, such as lubricating oil under pressure. Secured on the outer end of the shaft 29 adjacent the wall 23 is a large sprocket wheel 36 which is drivingly connected by a sprocket chain 37 to a small sprocket wheel 38 mounted on the end of the output shaft 39 of a gear reduction 40, the input shaft 41 of said gear reduction unit being drivingly connected by a sleeve coupling 42 to the shaft 43 of the main driving motor 16. The unit 40 may be of the variable transmission type, and is therefor provided with a speed-changing lever 44 for changing the speed of the output shaft 39 as desired, over a specified range.

The opposite end of the shaft 29 is rotatably and sealingly supported in another bearing assembly 45 centrally mounted on a supporting disc 46 which is secured to the central portion of end wall 22 over an aperture 47 provided therein. The bearing assembly 45 includes the flanged sleeve portion 48 which receives the end of the shaft 29 and which is sealingly secured to the disc 46.

Designated at 50 is a tubular member which coaxially surrounds the shaft 29, the tubular member being rigidly secured to the opposite end portions of the shaft. Thus, adjacent the bearing assembly 30, a spacer sleeve 51 is provided between the end of tube 50 and the slightly enlarged end portion 52 of the shaft, the parts being secured rigidly together by a transverse fastening pin 53, as shown in FIGURE 3. A similar spacer sleeve 55 is provided on the opposite end portion of shaft 29 between the end of tube 50 and the shaft, and adjacent to the somewhat reduced right end portion 56 of shaft 29, as shown on FIGURE 3. Rigidly secured on and projecting radially from the sleeve 50 are a plurality of paddles 57 which are uniformly staggered in angular position along the length of the tubular member 50 and which provide a continuous thorough stirring action of the liquid in tank 18 responsive to the rotation of shaft 29.

Rigidly secured coaxially on the right end portion of tube 50, as viewed in FIGURE 3, is a drum-shaped member 58 formed with uniformly spaced peripheral slots 59 and provided with an inturned peripheral flange 60 which faces the generally circular main wall 61 of the drum member 58. Said main wall 61 is formed with a plurality of uniformly spaced circular apertures 62, as shown on FIGURE 7.

Designated at 63 are respective elongated cup members of arcuate cross section which connect flange 60 with the peripheral portion of the circular main wall 61 of the drum member 58. As shown in FIGURE 6, the cup members 63 are substantially uniformly spaced around the interior surface of the cylindrical wall of drum member 58 and face in the direction of rotation of said drum member, namely, in a clockwise direction, as viewed in FIGURE 6.

Rigidly secured to the end wall 22 of tank 18 is a discharge funnel member 65 comprising an upwardly flaring receiving portion 66 which merges with a horizontally extending outlet conduit portion 67 which passes through and which is rigidly secured in the lower portion of end wall 22. The funnel body 66 is provided with a cylindrical central passage 68 coaxial with the end portion 56 of shaft 29, said end portion 56 extending through the tubular passage 68, as shown on FIGURE 3. The funnel body 66 is provided with an open top end having parallel arcuate transverse edges 69, 69 which are concentric with the axis of shaft 29. As shown on FIGURE 6, the receiving funnel body 66 extends inwardly adjacent the circumferential path of movement of the cup members 63, being thus in a position to receive liquid conveyed upwardly by said cup members during the clockwise rotation of the cup members, as viewed in FIGURE 6, the liquid being discharged into the funnel body 66 as the cup members pass thereover.

Rotatably mounted on the sleeve portion 48 of the bearing assembly 45 is a sleeve member 70 to which is rigidly secured a sector-shaped plate member 71 extending parallel to the outer wall of the funnel body 66 and being rigidly secured at its peripheral edge to an arcuate valve plate 72 arranged to overlie and at times cover the top ends of the funnel body 66. Thus, the arcuate main body portion of the valve plate 72 is coaxial with the transverse edges 69 of the top end of the funnel body 66 and closely overlies said edges, being of sufficient peripheral extent to extend beyond the side edges of the funnel body opening when the valve plate 72 is in its fully closed position, as shown in FIGURE 4. Said valve plate is rotatable counterclockwise, as will be presently described, from the fully closed position thereof shown in FIGURE 4 to the substantially fully open position thereof shown in FIGURE 5.

The valve plate 72 is provided at its edge opposite the supporting sector 71 with an inturned flange 74 which overlaps the inner marginal portion of the funnel body 66. The flange 74 cooperates with the sector 71 to aid in accurately guiding the valve plate 72 relative to the stationary funnel body 66.

Rotatably journaled transversely in the upper right end corner portion of tank 18, as viewed in FIGURE 3, is a screw shaft 75 provided with the external operating crank handle 76. Threadedly engaged on the screw shaft 75 is a traveling nut member 77 of rectangular shape which is slidably retained within a transversely extending angle bar 78 secured to the inside surface of the top marginal portion of the transverse end wall 22, as is clearly shown in FIGURES 3, 4 and 5. Thus, the angle bar 78 holds the substantially square nut member 77 against rotation while permitting it to travel along the screw shaft 75 responsive to rotation of said shaft by the crank handle 76.

Rigidly secured to the sleeve member 70 is an outwardly extending arm 79, the end of said arm being connected to the nut member 77 by a link bar 80, the link bar being pivoted at 81 to a depending lug 82 provided on the nut member 77. When the nut member 77 is in its extreme rightward position on the screw shaft 75, as shown on FIGURE 4, the linkage comprising link bar 80 and arm 79 holds the arcuate valve plate 72 in its fully closed position over the top of the funnel body 66. Conversely, when the nut member 77 is in its extreme leftward position, as shown in FIGURE 5, said linkage holds the arcuate valve plate 72 in its fully open position, fully exposing the top end of the funnel body 66 to the liquid delivered thereto by the rotating cup members 63. Any desired intermediate degree of closure of the valve plate 72 may be provided by adjusting the position of the traveling nut 77 along the threaded screw shaft 75. This adjustment may be performed manually by means of the crank handle 76, or, if so desired, may be performed automatically by coupling suitable drive means to the shaft 75, for example, by coupling an electric motor to said shaft, the motor being remotely controlled, for example, by means sensitive to the pH of the discharging liquid.

As shown in FIGURE 3, the upper portion of the end wall 22 of tank 18 is provided with an inlet conduit 83. The conduit 83 is connected by a supply conduit 84 through a manually controlled valve 85 to a conduit 86 which is connected to the outlet of the pump 13, so that liquid from the sump reservoir 12 may be delivered to tank 18 when the pump 13 is operating, assuming valve 85 to be open. The discharge end 67 of the funnel member 65 is connected by a conduit 87 to the sump reservoir 12 at a region adjacent the intake conduit 15. The lower portion of the transverse wall 22 is provided with a drain conduit 88 which is normally closed by means of a plug 89.

In operation, the tank 18 is first filled with water from the sump reservoir 12 through the filler inlet conduit 84 by opening the valve 85 with the pump 13 in operation, the tank 18 being filled to a suitable level, for example, to the level indicated by the dotted line 90 in FIGURE 3, which is such as to provide ample space in the tank for the reception of the hydrated lime or other chemical material with which the water is to be treated. With the valve plate 72 in its closed position, as shown on FIGURE 4, the hydrated lime or other material to be employed is charged into the machine through the opening 27, the cover 28 being removed to permit the material to be admitted into the tank. The rotation of the shaft 29 causes the paddles 57 and the drum member 58 to rotate, thoroughly mixing the material with the water in the tank and forming a slurry which can be readily distributed. The crank handle 76 is then operated to move the nut member 77 to a position corresponding to the desired degree of opening of the valve plate 72, whereupon the slurry is delivered into the top end of the funnel member 65 and is thence delivered through the conduit 87 into the sump reservoir 12 for subsequent distribution through pump 13 and outlet conduit 14 to the external body of water. The slurry material fed into the sump reservoir 12 provides the necessary neutralization or other desired treatment of the water or other liquid being discharged. As will readily be apparent, the amount of slurry delivered can be readily regulated by adjusting the position of the traveling nut member 77. Thus, to increase the feed of the slurry material, the nut member 77 is moved leftwards, as viewed in FIGURE 5, toward the position of FIGURE 5. To reduce the feed, the nut member 77 is moved rightward toward the position of FIGURE 4. Thus, with the machine charged and running, the cup members 63 dip in the slurry in the tank and as they move over the top end of the funnel body 66 they discharge the slurry into the funnel member or alternatively onto the valve plate 72. That portion of the slurry which enters the funnel is fed to the raw water being treated, and the remainder merely returns to the tank 18.

While a specific embodiment of an improved apparatus for intermixing a treatment material with a liquid and for feeding the resultant slurry to an external body of liquid has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. Apparatus for intermixing a treatment material with a liquid to form a slurry and for feeding the slurry to an external body of liquid comprising a mixing tank provided with a rotary shaft having agitating means thereon, means to feed liquid into the tank, means to admit treatment material into the tank, an upstanding discharge funnel rigidly mounted in the tank, a conveyor drum on said shaft receiving said funnel, said drum being provided on its inside periphery with cup members movable successively to positions over said funnel as the drum rotates, whereby to discharge slurry toward the top of the funnel, and adjustable closure means mounted over the top of the funnel between the cup members and the funnel.

2. Apparatus for intermixing a treatment material with a liquid to form a slurry and for feeding the slurry to an external body of liquid comprising a mixing tank provided with a rotary shaft having agitating means thereon, means to feed liquid into the tank, means to admit treatment material into the tank, an upstanding discharge funnel rigidly mounted in the tank, a conveyor drum on said shaft receiving said funnel, said drum being provided on its inside periphery with cup members movable successively to positions over said funnel as the drum rotates, whereby to discharge slurry toward the top of the funnel, a closure plate rotatably mounted in the tank and being movable into overlying relation to the top of the funnel, and means to vary the angular position of said closure plate, whereby to vary the rate of discharge of the slurry.

3. Apparatus for intermixing a treatment material with a liquid to form a slurry and for feeding the slurry to an external body of liquid comprising a mixing tank provided with a rotary shaft having agitating means thereon, means to feed liquid into the tank, means to admit treatment material into the tank, an upstanding discharge funnel rigidly mounted in the tank, a conveyor drum on said shaft receiving said funnel, said drum being provided on its inside periphery with cup members movable successively to positions over said funnel as the drum rotates, whereby to discharge slurry toward the top of the funnel, a closure plate rotatably mounted for rotation around the same axis as the shaft between the cup members and the funnel, said closure plate being movable into overlying relation to the top of the funnel, and means to vary the angular position of said closure plate, whereby to vary the rate of discharge of the slurry.

4. Apparatus for intermixing a treatment material with a liquid to form a slurry and for feeding the slurry to an external body of liquid comprising a mixing tank provided with a rotary shaft having agitating means thereon, means to feed liquid into the tank, means to admit treatment material into the tank, an upstanding discharge funnel rigidly mounted in the tank, said shaft extending through the intermediate portion of the funnel, a conveyor drum on said shaft receiving said funnel, said drum being provided on its inside periphery with cup members movable successively to positions over said funnel as the drum rotates, whereby to discharge slurry toward the top of the funnel, a closure plate rotatably mounted for rotation around the same axis as the shaft between the cup members and the funnel and being movable into overlying relation to the top of the funnel, and means to vary the angular position of said closure plate, whereby to vary the rate of discharge of the slurry.

5. Apparatus for intermixing a treatment material with a liquid to form a slurry and for feeding the slurry to an external body of liquid comprising a mixing tank provided with a rotary shaft having agitating means thereon, means to feed liquid into the tank, means to admit treatment material into the tank, an upstanding discharge funnel rigidly mounted in the tank, said shaft extending through the intermediate portion of the funnel, a conveyor drum on said shaft receiving said funnel, said drum being provided on its inside periphery with cup members movable successively to positions over said funnel as the drum rotates, whereby to discharge slurry toward the top of the funnel, an arcuate closure plate coaxial with the shaft rotatably mounted in the tank for rotation around the same axis as the shaft and being angularly movable into positions overlying the top of the funnel, transverse rotatable shaft means journaled in the tank, and means rotating said closure plate responsive to rotation of said last-named shaft means.

6. Apparatus for intermixing a treatment material with a liquid to form a slurry and for feeding the slurry to an external body of liquid comprising a mixing tank provided with a rotary shaft having agitating means thereon, means to feed liquid into the tank, means to admit treatment material into the tank, an upstanding discharge funnel rigidly mounted in the tank, said shaft extending through the intermediate portion of the funnel, a conveyor drum on said shaft receiving said funnel, said drum being provided on its inside periphery with cup members movable successively to positions over said funnel as the drum rotates, whereby to discharge slurry toward the top of the funnel, an arcuate closure plate coaxial with the shaft rotatably mounted in the tank for rotation around the same axis as the shaft and being angularly movable into positions overlying the top of the funnel, transverse rotatable shaft means journaled in the tank, said last-named shaft means having external threads, a traveling nut engaged on said threads, and linkage means connecting said traveling nut to said closure plate and rotating said closure plate responsive to movement of the nut along said last-named shaft means.

7. Apparatus for intermixing a treatment material with a liquid to form a slurry and for feeding the slurry to an external body of liquid comprising a mixing tank provided with a rotary shaft having agitating means thereon, means to feed liquid into the tank, means to admit treatment material into the tank, an upstanding discharge funnel rigidly mounted in the tank, said shaft extending through the intermediate portion of the funnel, a conveyor drum on said shaft receiving said funnel, said drum being provided on its inside periphery with cut members movable successively to positions over said funnel as the drum rotates, whereby to discharge slurry toward the top of the funnel, an arcuate closure plate coaxial with the shaft rotatably mounted in the tank between the cup members and the funnel for rotation around the same axis as the shaft and being angularly movable into positions overlying the top of the funnel, transverse rotatable shaft means journaled in the tank, said last-named shaft means having external threads, a traveling nut engaged on said threads, an arm rigidly connected to said closure plate, and a link bar connecting said arm to said traveling nut, whereby to rotate said closure plate responsive to movement of the nut along said last-named shaft means.

8. Apparatus for intermixing comminuted treatment material with liquid from a sump reservoir and for returning the resultant slurry to the sump reservoir comprising a mixing tank provided with a rotary agitator shaft, conduit means connected between the reservoir and the tank to feed liquid into the tank, means to admit comminuted treatment material into the top of the tank, an upstanding discharge funnel rigidly mounted in the tank, conduit means connecting said funnel to the sump reservoir, conveyor means mounted on the agitator shaft and including cup members movable successively to positions over the funnel as the shaft rotates, whereby to discharge slurry toward the top of the funnel, and rotatably adjustable closure means mounted in the tank between the cup members and the top of the funnel.

9. Apparatus for intermixing comminuted treatment material with liquid from a sump reservoir and for returning the resultant slurry to the sump reservoir comprising a mixing tank provided with a rotary agitator shaft, conduit means connected between the reservoir and the tank to feed liquid into the tank, means to admit comminuted treatment material into the top of the tank, an upstanding discharge funnel rigidly mounted in the tank, said shaft extending through the intermediate portion of the funnel, conduit means connecting said funnel to the sump reservoir, conveyor means mounted on the agitator shaft and including cup members movable successively to positions over the funnel as the shaft rotates, whereby to discharge slurry toward the top of the funnel, an arcuate closure plate coaxial with the shaft rotatably mounted in the tank for rotation around the same axis as the shaft and being located between the cup members and the funnel, said closure plate being angularly movable into positions overlying the top of the funnel, transverse rotatable shaft means journaled in the tank, and means rotating said closure plate responsive to rotation of said last-named shaft means.

10. Apparatus for intermixing comminuted treatment material with liquid from a sump reservoir and for returning the resultant slurry to the sump reservoir comprising a mixing tank provided with a rotary agitator shaft, conduit means connected between the reservoir and the tank to feed liquid into the tank, means to admit comminuted treatment material into the top of the tank, an upstanding discharge funnel rigidly mounted in the tank, said shaft extending through the intermediate portion of the funnel, conduit means connecting said funnel to the sump reservoir, conveyor means mounted on the agitator shaft and including cup members movable successively to positions over the funnel as the shaft rotates, whereby to discharge slurry toward the top of the funnel, an arcuate closure plate coaxial with the shaft rotatably mounted in the tank between the cup members and the funnel for rotation around the same axis as the shaft and being angularly movable into positions overlying the top of the funnel, transverse rotatable shaft means journaled in the tank, said last-named shaft means having external threads, a traveling nut engaged on said threads, an arm rigidly connected to said closure plate, and a link bar connecting said arm to said traveling nut, whereby to rotate said closure plate responsive to movement of the nut along said last-named shaft means.

References Cited by the Examiner
UNITED STATES PATENTS

| | | | |
|---|---|---|---|
| 2,238,690 | 4/1941 | Fell | 259—68 |
| 2,484,070 | 10/1949 | Boyce | 259—45 |
| 3,088,711 | 5/1963 | Phillips | 259—3 |
| 3,138,367 | 6/1964 | Raether | 259—3 |
| 3,194,538 | 7/1965 | Murray | 259—3 |

WALTER A. SCHEEL, *Primary Examiner.*

R. W. JENKINS, *Assistant Examiner.*